United States Patent [19]

Shih

[11] 3,978,726

[45] Sept. 7, 1976

[54] FLUID CURRENT METER

[75] Inventor: Hsing-Hua Shih, Bowie, Md.

[73] Assignee: Westinghouse Electric Corporation, Pittsburgh, Pa.

[22] Filed: May 5, 1975

[21] Appl. No.: 574,832

[52] U.S. Cl.................................. 73/189; 73/194 A
[51] Int. Cl.².............................................. G01D 1/00
[58] Field of Search................. 73/170 A, 188, 189, 73/194 A

[56] References Cited
UNITED STATES PATENTS 3,379,060 4/1968 Pear, Jr................................ 73/189
3,693,440 9/1972 Olson............................ 73/170 AX Primary Examiner—Jerry W. Myracle
Attorney, Agent, or Firm—D. Schron

[57] ABSTRACT

Two pairs of acoustic transducers are provided for obtaining fluid current velocity measurements. The pairs of transducers are mounted in a supporting ring which introduces a controlled source of error in the measurement process, the configuration however resulting in a nearly constant error regardless of flow direction. The constant error introduced by the ring supporting structure may be easily corrected by a scaling factor in the signal processing circuitry utilized to compute fluid velocity.

12 Claims, 21 Drawing Figures

FLUID CURRENT METER

BACKGROUND OF THE INVENTION

1. Field of the Invention

The invention in general relates to oceanographic instrumentation, and more particularly to a meter for obtaining current velocity and direction.

2. Description of the Prior Art

In oceanographic studies, various sensors are utilized for obtaining oceanographic data. One such sensor or instrument is a fluid current meter which is placed at a fixed geographical point and measures the flow past the point as a function of time. The measurements obtained are utilized, in conjunction with other data to develop an understanding of the kinematics and dynamics which control the circulation in a section of an ocean, river or estuary, for example.

A variety of sensors exists for performing such measurements however many oceanographic studies require a high probability of successful performance over a relatively long deployment, thus ruling out current meters with moving parts exposed to the water environment.

Moving parts are eliminated in acoustic type current meters wherein acoustic transducers are provided for transmitting acoustic pulses toward one another and the difference in the travel time of acoustic pulses due to current, is obtained thereby providing an indication of fluid velocity. Generally two pairs of transducers are utilized with each being contained within a probe, or post. When current flow is in line with two of the posts, an error is introduced into the reading however the error is correctable for that current direction. In reality however the current direction may vary within 360° and unless the current direction is known, proper correction cannot be made to the output reading. Proper correction could be made if a separate sensor which weathervaned with the current were provided but as previously stated one requirement for such meter is that it have no moving parts exposed to the water environment.

SUMMARY OF THE INVENTION

The present invention provides a fluid flow velocity measuring instrument which requires no moving parts exposed to the ambient water medium and which provides a highly accurate output indication of current velocity even in the presence of variable current directions.

The current meter includes a plurality of pairs of acoustic transducers mounted in a support means which is in the form of a ring. The transducers of each pair are in acoustic communication with one another along an acoustic path and in a preferred embodiment two pairs of transducers are utilized with the acoustic paths within the center of the ring defining a measurement plane.

The ring structure preferably extends for 360° in the measurement plane to offer an obstruction to current flow regardless of current direction. This controlled obstruction modifies the resultant output readings in a manner to provide for a constant error which can be easily corrected.

In one embodiment the cross section of the ring is in the form of a hydrofoil which results in a low magnitude of flow error and which aids in reducing error when the ring is tilted, within certain limits, relative to current flow.

DESCRIPTION OF THE PREFERRED EMBODIMENTS

Figure 1:
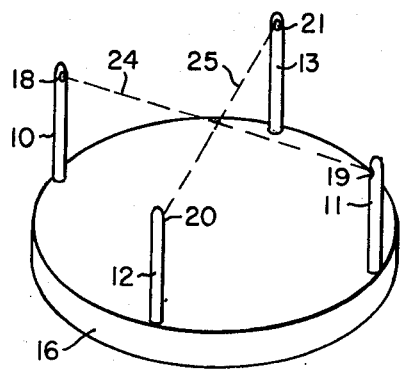
FIG. 1 illustrates an acoustic fluid current meter of the prior art.

Referring now to FIG. 1, there is illustrated a fluid current meter of the prior art. The meter, which may be constructed without moving parts, includes four transducer support posts 10 to 13 carried by a base member 16 and including at their upper end four acoustic transducers 18 to 21 respectively.

Transducers 18 and 19 are arranged to transmit acoustic energy toward one another along an acoustic path 24, and similarly acoustic transducers 20 and 21 transmit acoustic energy toward one another along a second acoustic path 25 perpendicular to acoustic path 24.

When positioned in the water environment, any fluid flow causes relative speeding up or slowing down of the acoustic energy transmitted, depending upon current direction, and the difference in time travel over paths 24 and 25 may be utilized to compute fluid flow parameters. When the current flow is along the line of one of the perpendicular acoustic paths, the wake behind the leading post and ahead of the trailing post slows the water reducing the average speed along the path and this velocity defect within the wake along the acoustic path is considered to be an important factor that affects the accuracy of the system.

If the current direction were always parallel to one of the acoustic paths, then the error introduced by the wake flow could be calculated and the output reading properly scaled to give an accurate indication. In actuality however and particularly when deployed in the ocean, the current varies its direction so that any error correction applied for current from one direction would not be applicable for other directions.

Figure 2:
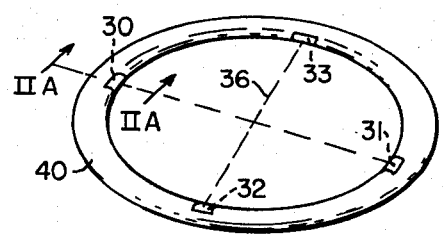
FIGS. 2 and 2A illustrate one embodiment of the present invention, FIG. 2A being a cross-sectional view along lines AA of FIG. 2.

The present invention provides for a controlled constant error regardless of current direction and one embodiment is illustrated in FIG. 2. A plurality of pairs of transducers, for example transducers 30 and 31 constituting a first pair and 32 and 33 a second pair are provided, as in the prior art, for transmitting acoustic energy toward one another along respective acoustic paths 35 and 36. A support means 40 contains the pairs of transducers and is constructed and arranged to extend along a generally circular path from one transducer to a next so as to provide an obstruction to fluid flow at angles $\pm\theta$ relative to an acoustic axis. In the preferred embodiment the support means takes a form of a continuous ring so as to provide structural rigidity and to be interposed in the path of the current for 360°.

Although each transducer has an associated beam pattern, acoustic energy transmitted from one transducer to an opposing transducer may be considered to travel along an acoustic path. For explanatory purposes, the crossed acoustic paths will be considered to be coplanar with the plane being termed herein the measurement plane, although it is to be understood that the actual relative positioning of the acoustic paths may vary, depending upon the thickness of the ring.

Figure 2A:
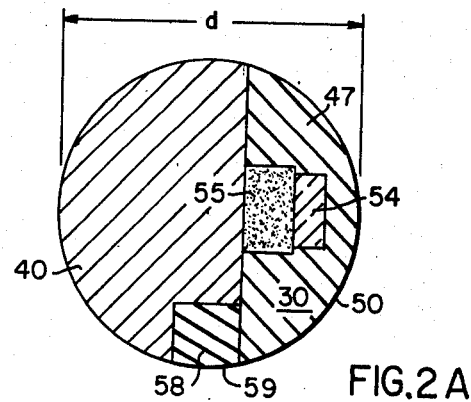

FIG. 2A illustrates a cross-section along lines AA of FIG. 2 and it is seen that the ring which for example may be stainless steel, has a circular cross section of diameter d.

The transducer 30 is positioned within a notch 47 of the ring and is covered with a potting material 50 having the same, or similar transmission characteristics as the ambient water medium, polyurethane being one example and shaped to conform with the cross sectional shape of the ring 40.

The transducer 30 may be of a variety of conventional designs and in the embodiment illustrated in FIG. 2A the transducer includes an active crystal 54 such as lead zirconate titanate (PZT) coupled to a backing member 55 such a syntactic foam. Wires (not illustrated) may be conducted to the transducer 30 for signal conduction by way of a groove 58 machined or otherwise formed into the ring 40. In order to preserve the cross-sectional shape, the polyurethane material conforming to the circular shape of the ring in the notch 47 may be also placed in the groove 58 as indicated at 59.

Figure 3:
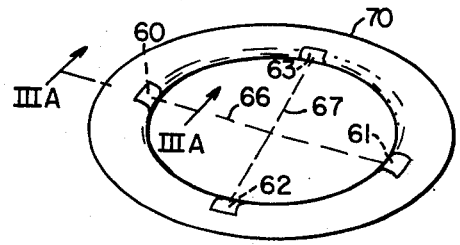
FIGS. 3 and 3A are another embodiment of the present invention, FIG. 3A being a cross-sectional view along line AA of FIG. 3.
Figure 3A:
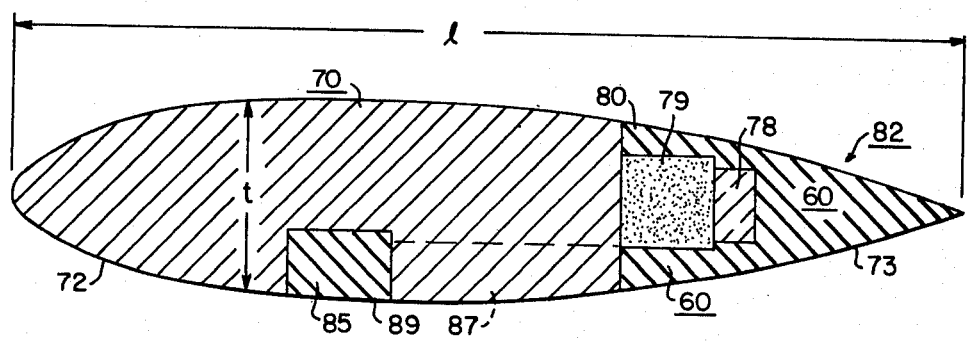

FIG. 3 illustrates another embodiment of the invention which includes a plurality of transducers 60 to 63 oriented as illustrated for transmitting acoustic energy along respective acoustic paths 66 and 67 and carried by a support ring 70. In order to reduce turbulence the cross section of the ring 70 is in the shape of a hydrofoil (airfoil) as illustrated in FIG. 3A showing a cross section along the lines AA of FIG. 3.

The ring 70 has a rounded leading edge 72 and a tapered trailing edge 73 with an overall length 1 and a maximum thickness t. The transducer 60, similar to transducers 30, includes an active crystal 78 with a backing member 79 located in a notch 80 of the ring 70. As was the case with respect to FIG. 2A, the transducer 60 is potted in a polyurethane material 82 formed to the hydrofoil shape. A groove 85 is provided for the signal communicating wires which are conducted to the transducer 60 through a channel or groove 87, both grooves 85 and 87 being filled in with a potting material 89.

The particular dimensions will depend upon various factors such as maximum current to be encountered. By way of example, the ring illustrated in FIG. 2 has been constructed with the dimension d equal to 0.25 inches (0.635 centimeters). The outside diameter of the ring was 12.5 inches (31.75 cm.) with the inside diameter being 12.0 inches (30.48 cm.).

The ring of FIG. 3 was constructed with an overall length 1 of 1.25 inches (3.175 centimeters) and a thickness t equal to 0.25 inches (0.635 centimeters). The outside diameter of the ring was 14.00 inches (35.56 cm.) with the inside diameter being 11.50 inches (29.21 cm.). Distance between transducer pairs as measured from their front surface, was 12 inches (30.48 centimeters).

Figure 4:
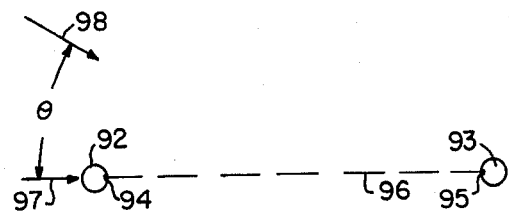
FIG. 4 is a plan view of two of the support posts of FIG. 1, and FIGS. 4A and 4C illustrate curves of instantaneous fluid velocity between the posts for various relative angles of current direction.

FIG. 4 illustrates a plan view of two transducer support posts 92 and 93 of the prior art. The acoustic path in the water between these posts is assumed to be between points 94 and 95 with the distance between these points being equal to $x_n$. Thus in FIGS. 4A through 4C, the distance $x_n$ is plotted on the horizontal axis from $x_o$ to $x_n$ in increments.

Figure 4A:
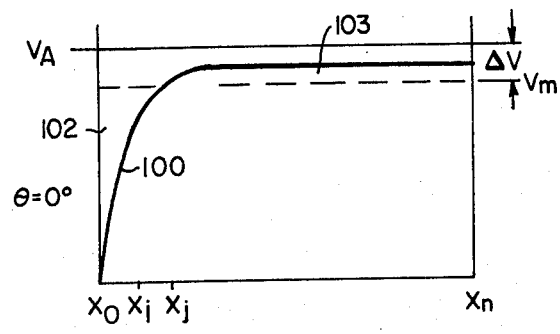

In FIG. 4, arrow 97 represents current in line with the acoustic path between the transducers, and posts 92 and 93, and arrow 98 represents current at any angle $\theta$ with respect to the acoustic path. In FIG. 4A, curve 100 represents the instantaneous velocity of the current in the acoustic path between the two posts as a function of distance behind the leading post. The velocity curves illustrated herein are generalized approximations for illustrative purposes since the actual plot is a function of a number of different variables such as post diameter, path length, drag coefficient, and Reynolds No., for example.

Figure 4B:
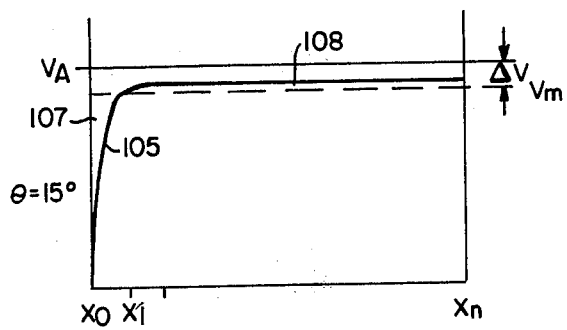
Figure 4C:
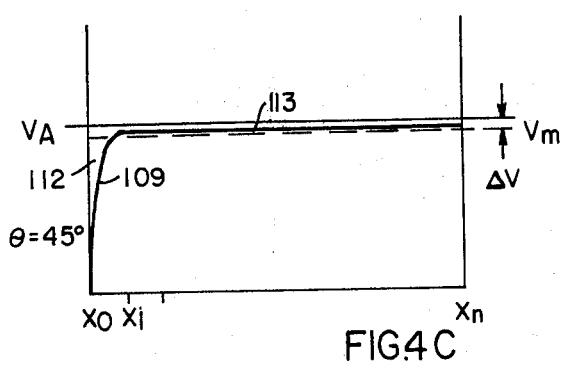

In FIGS. 4A through 4C, the vertical scale representing instantaneous velocity has a maximum value designated $v_A$ which represents the component of fluid flow along the acoustic path 96 in the absence of any obstruction, that is from points 94 to 95 and as though the posts and transducers were not there.

FIG. 4A illustrates the velocity plot for current having the same direction as arrow 97. With the current in line with the acoustic path, that is $\theta$ equals 0°, the velocity just past the post is 0 with the value increasing as the distance $x$ increases up until some leveling off value. This value is below $v_A$ since the velocity can never reach a true maximum with this limited distance because of the presence of the posts. An average velocity however is obtained and this average velocity is the actual velocity measured and is designated $v_m$ with the difference between the measured velocity $v_m$ and the maximum possible velocity $v_A$ being equal to $\Delta v$. $v_m$ is located at a position such that the area 102 between curve 100 and the dotted line level $v_m$ is equal to the area 103 between the dotted line level $v_m$ and the remainder of curve 100.

FIG. 4B illustrates the situation for a current direction $\theta$ of 15°. If it is assumed, for the purposes of explanation, that the current has a magnitude of unity (1), the magnitude of $v_A$ in FIG. 4B would be 0.966 (1 × cosine 15°). Since the flow is less obstructed by the post the velocity curve 105 levels out at a distance closer to the post than that of curve 100 of FIG. 4A. The actual measured value $v_m$ is located at a position where the area 107 is equal to the area 108, with the difference between the measured value $v_m$ and the maximum actual value $v_A$ being designated $\Delta v$.

Curve 4C illustrates the situation for $\theta$ equal to 45° and since the posts have less effect on current flow than in the previous two cases, the velocity curve 109 is seen to reach a leveling out portion fairly rapidly with the measured velocity level being at a position where area 112 is equal to area 113. For the 45° example $v_A$ would be equal to 0.707, with difference between the measured value $v_m$ and the maximum actual value $v_A$ being designated $\Delta v$. It is seen that as the angle $\theta$ increases, the effect of the posts become less and less such that $\Delta v$'s decrease in magnitude as does the ratio of $\Delta v$ to $v_A$.

Figure 5:
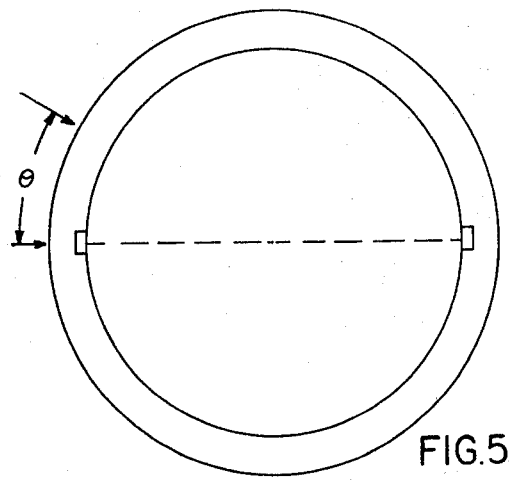
FIG. 5 is a plan view of an embodiment of the present invention.
Figure 5A:
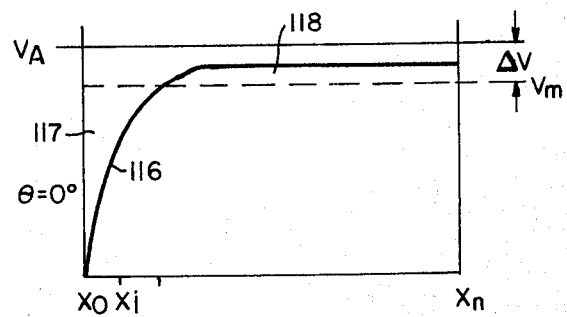
FIGS. 5A through 5C are velocity curves for various angles of current direction, as in FIGS. 4A through 4C.
Figure 5B:
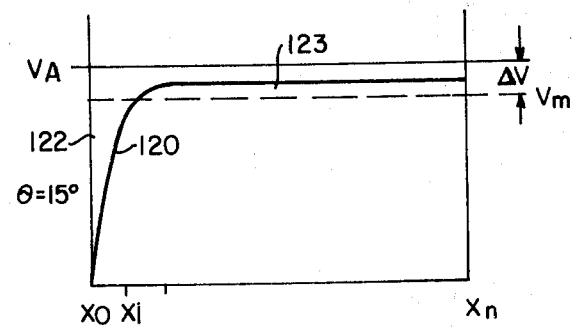
Figure 5C:
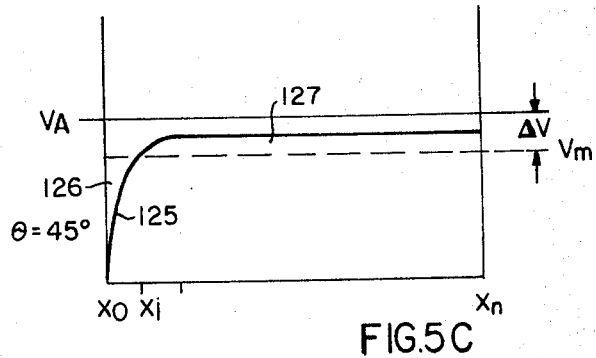

FIG. 5 illustrates a plan view of the present invention, with FIGS. 5A through 5C illustrating the velocity curves for the same respective angles of FIGS. 4A through 4C. For the 0° situation, velocity curve 116 is very similar to curve 100 of FIG. 4A, and the measured value $v_m$ is that value where the areas 117 and 118 are equal above and below the $v_m$ level. The difference between $v_A$ and $v_m$ is designated $\Delta v$.

For the 15° flow in FIG. 5B, curve 120 is dissimilar to its counterpart curve 105 in FIG. 4B due to the fact that the ring presents an obstruction to flow even at the 15° angle. Again equal areas 122 and 123 define the measured value $v_m$ with the difference $\Delta v$ between $v_A$ and $v_m$ being greater than the corresponding $\Delta v$ in FIG. 4B.

In FIG. 5C for the 45° case, curve 125 is quite different from its counterpart in FIG. 4C due to the presence of the ring obstruction in the flow path. Equal areas 126 and 127 define the value of $v_m$ and it is seen that $\Delta$ to $v$ is much more than its counterpart in FIG. 4C.

Only one acoustic path is analyzed since the results obtained for the second path would be similar to that obtained with the first.

In actual tests, the ratio of $\Delta v$ to $v_A$ varied significantly whereas that same ratio with the present invention remained substantially constant. Test results may be illustrated with respect to FIG. 6 wherein $\theta$ is plotted on the horizontal axis and relative velocity on the vertical axis. Curve 130 is a true cosine response curve illustrating what the actual velocity $v_A$ should be as a function of $\theta$, in the absence of any obstructions. Curve 131 represents the velocity measurements obtained with the prior art post apparatus and curve 132 represents the velocity measurements obtained with the embodiment of the invention illustrated in FIG. 2A. The vertical distance between the true cosine curve 130 and the curve 131 at any angle represents the $\Delta v$'s plotted for example in FIGS. 4A through 4C. Similarly, the vertical distance between the true cosine curve 130 and curve 132 at any angle represents the $\Delta v$'s plotted for example in FIGS. 5A through 5C. The $\Delta v$'s in the present invention get smaller in proportion the values of curve 130 as a function of $\theta$ whereas the same is not true of the prior art.

Figure 7:
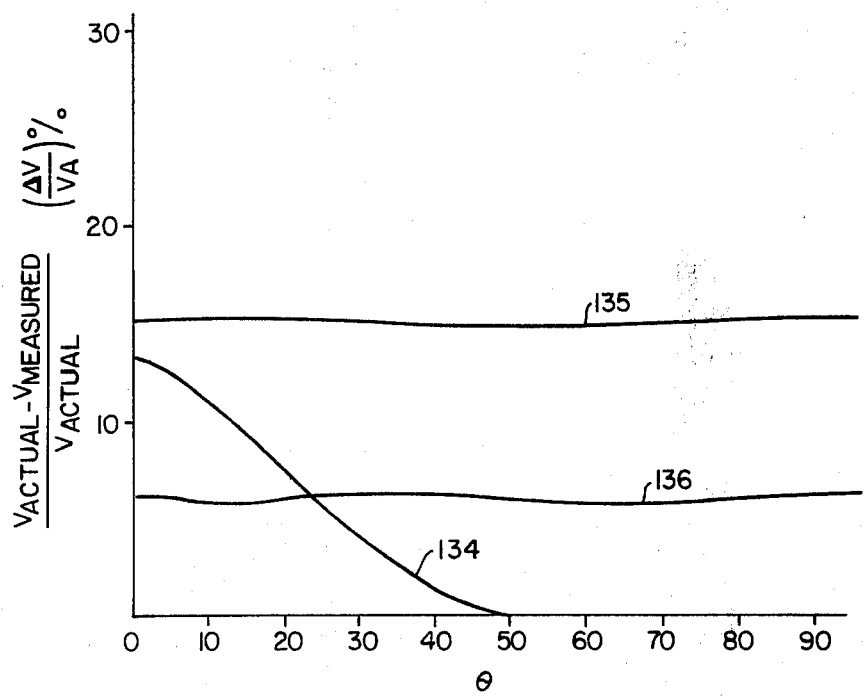
FIG. 7 are curves illustrating relative errors as a function of current direction for the prior art and the present invention.

This is illustrated in FIG. 7 wherein $\theta$ in degrees is plotted on the horizontal axis and the ratio of $\Delta v$ to $v$ actual ($v_A$) representing a percentage error, is plotted on the vertical axis. The curve 134 represents the percentage error for the case of 0.375 inch (0.952 cm.) cylindrical probes spaced at a distance of 16 inches (40.64 cm.). It is seen that when the current is in line with the acoustic path the error is approximately 13% with the error decreasing to 0° at approximately 50°. With this curve the measured readings could be corrected, however this would require a knowledge of flow direction and moving parts to obtain such flow direction are undesirable, especially for long deployment periods.

The percentage error with the present invention is illustrated by curve 135, plotted for the embodiment illustrated in FIGS. 2 and 2A with the previously given dimensions, and curve 136 plotted for the embodiment illustrated in FIGS. 3 and 3A with the previously given dimensions. It is seen that for the hydrofoil design, the percentage error is relatively constant at about 6%, and with the tubular design the percentage error is relatively constant at about 15%, over the whole range of $\theta$ equals 0° to 90°. FIG. 7 therefore illustrates that with the present invention errors in the measurement as a function of angle of incidence of the current is substantially a constant independent of the angle and it is therefore possible to correct the velocity readings to the actual readings by a simple scaling factor in the computation circuitry.

Figure 6:
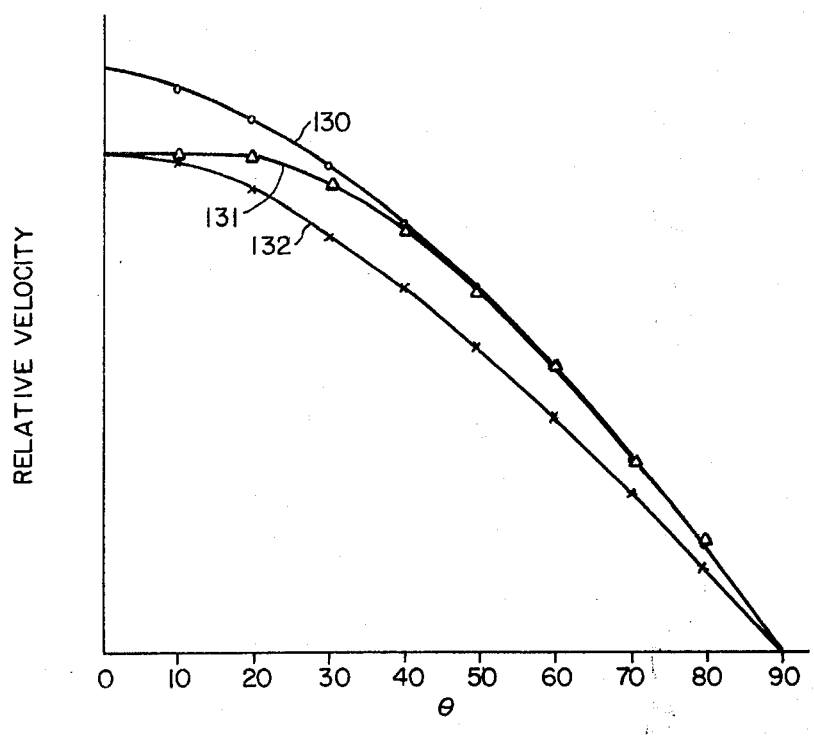
FIG. 6 are curves illustrating a true cosine response and the actual response of the prior art and present invention, as a function of flow direction.
Figure 8:
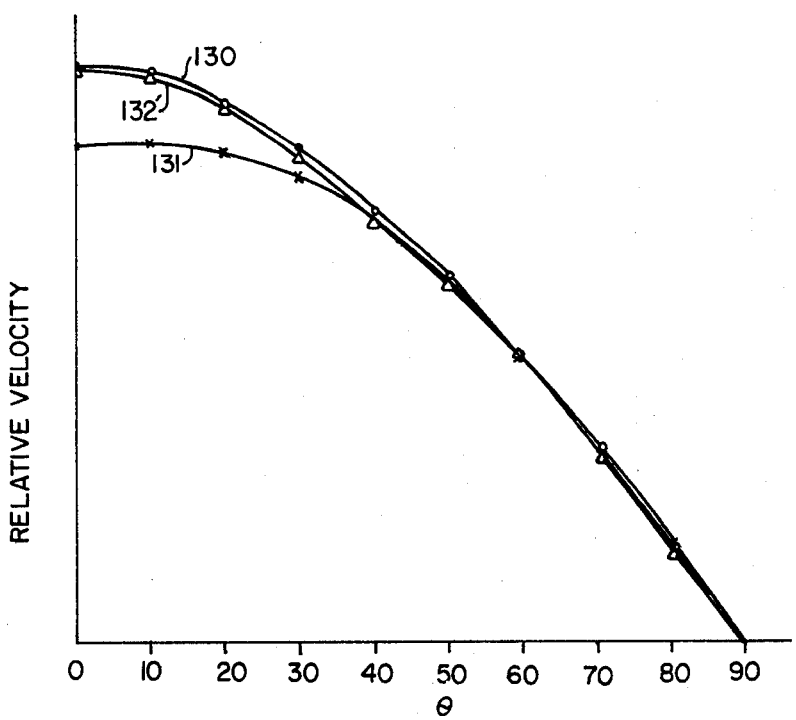
FIG. 8 illustrates the curves of FIG. 6 with correction applied to the readouts of the present invention.

By applying a scaling factor of for example 15% the resulting curve 132 of FIG. 6 would closely approximate the true cosine curve 130, as illustrated in FIG. 8 wherein scaled curve 132 is designated 132'. Similar results obtain with the hydrofoil design by applying a scaling factor of approximately 6%.

Figure 9:
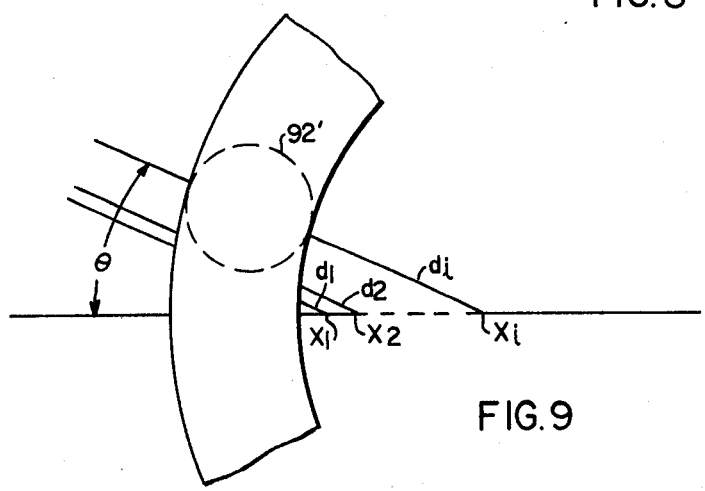
FIG. 9 illustrates a portion of the ring of FIG. 5 and serves to illustrate certain distances.

The mechanism by which the circular support accomplishes this constant flow velocity error for any incident current direction is illustrated in FIG. 9. Very basically, and with additional reference to FIGS. 4A through C and 5A through C, current incident on the ring at some angle $\theta$ has an obstruction interposed in its path due to the ring configuration. For example the instantaneous current at some point $x_i$ along the acoustic path would be the same as that at some distance $x_j$ in FIG. 4A which equals $d_i$ (FIG. 9) as though the current were in line with an imaginary post 92'. For any incident current angle, the actual hydrodynamic analysis involves determining the elemental distances $d_1$, $d_2$, ... $d_i$ etc. from the circular section of the ring to the points $x_1$, $x_2$ ... $x_i$ etc. and then arithmetically integrating the obtained magnitudes.

Figure 10:
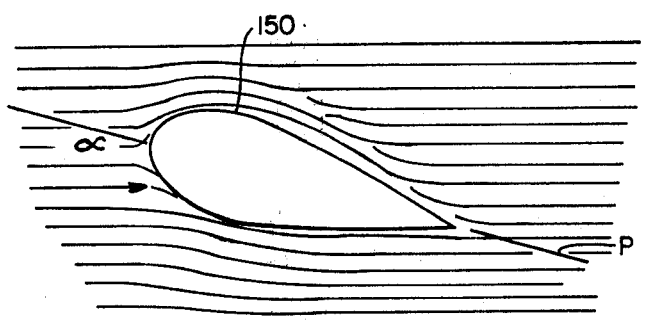
FIG. 10 illustrates a cross-section of the embodiment as illustrated in FIG. 3, at a certain tilt angle with respect to current direction.

While a ring with a circular cross section, as in FIG. 2A, effectively eliminates measurement errors in the measurement plane, it does little to modify the current which flows at an angle to the measurement plane. This condition can exist if the meter is mounted such that it can tilt with respect to the horizontal, or if the current has a vertical component. The hydrofoil cross section illustrated in FIG. 3A, however, does solve this problem within a selected tilt range. For example, a portion of a ring 150 is illustrated in FIG. 10, showing the hydrofoil cross section and tilted such that it and the measurement plane p are at an angle $\alpha$ with respect to current flow. With the orientation illustrated, and in the absence of the ring 150, the component of current velocity along the measurement plane p would be reduced from its actual value by a factor of cosine $\alpha$. However, with the hydrofoil design, the flow over the trailing edge of the hydrofoil is increased due to the angle of attack and the effect, within certain limits, is inversely proportional to the cosine of $\alpha$ thus resulting in a substantially self-compensating arrangement.

Figure 11:
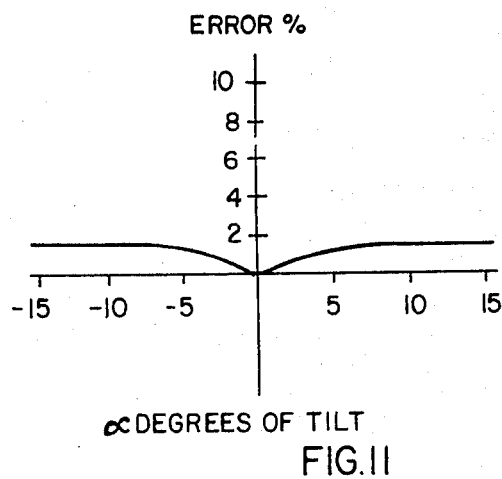
FIG. 11 is a curve illustrating error as a function of tilt angle.

FIG. 11 illustrates the effect of varying tilt angles. Tilt angle $\alpha$ is plotted on the horizontal scale and relative percentage error is plotted on the vertical scale. Results illustrate that between tilt angles $\pm 15°$, the error is no more than 2%.

Figure 12:
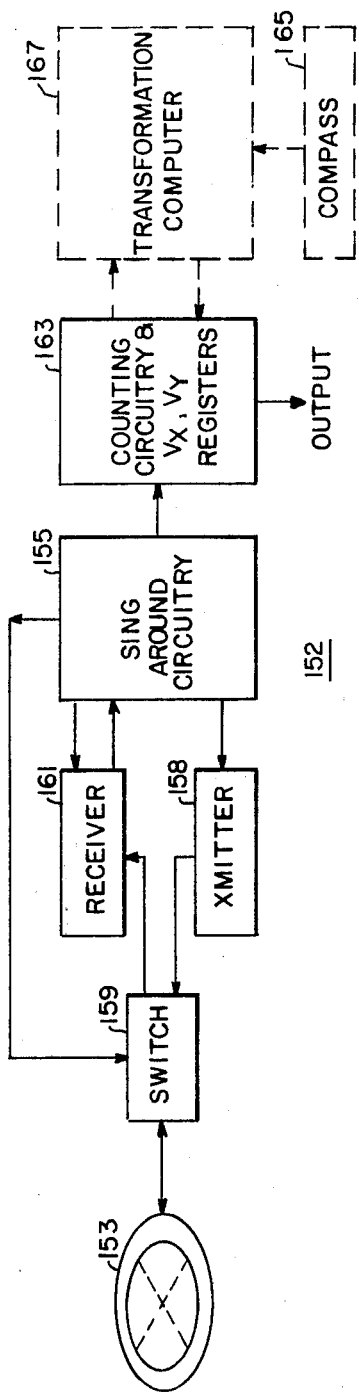
FIG. 12 is a block diagram illustrating an electronic section for obtaining velocity measurements.

Various electronic implementations are available for obtaining fluid velocity indications, and FIG. 12 illustrates one such arrangement. The electronic section 152 which is in signal communication with the support ring 153 containing the transducers, includes a sing around circuitry portion 155 which triggers a transmitter 158 which, in turn, provides proper transmitting signals to the transducers in the ring 153 by way of switch 159. Signals produced by the transducers as a result of acoustic impingement, are provided through switch 159 to the receiver 161 in signal communication with the sing around circuitry 155.

Basically, the electronic section measures that part of the current component along mutually orthogonal acoustic paths with the two resulting outputs defining two components of the current referenced to the housing. These two components $v_x$ and $v_y$ are in the form of numerical representations which are placed into respective $v_x$ and $v_y$ registers in circuit 163 for outputting so as to obtain current velocity with direction. This calculation may be made either at the meter site or at a remote location. One such electronic measuring system is more fully described and claimed in copending application Ser. No. 574,671 filed May 5, 1975 by C. E. Hardies and assigned to the assignee of the present invention and hereby incorporated by reference.

The output $v_x$ and $v_y$ define the two components of the current referenced to the meter. If the meter is in a fixed position with reference to the earth's coordinates, $v_x$ and $v_y$ can also define the magnetic vectors $v_n$ (north-south) and $v_e$ (east-west). Where the meter is free to rotate a compass must be added to measure the orientation of the meter with respect to the earth's coordinate system. In order to accomplish this, there may be provided a compass 165 for providing an orientation output signal to a transformation computer 167 so that the meter output $v_x$ and $v_y$ may be rotated to the earth's coordinate system. The transformation computer 167 is merely a circuit which multiplies the $v_x$ and $v_y$ readings by the sin or cosine of the angular deviation $\theta$ as indicated by the compass 165 and performs an arithmetic operation as follows:

$$v_n = v_x \cosine \theta - v_y \sin \theta \text{ and } v_e = v_x \sin \theta + v_y \cosine \theta$$

Figure 13:
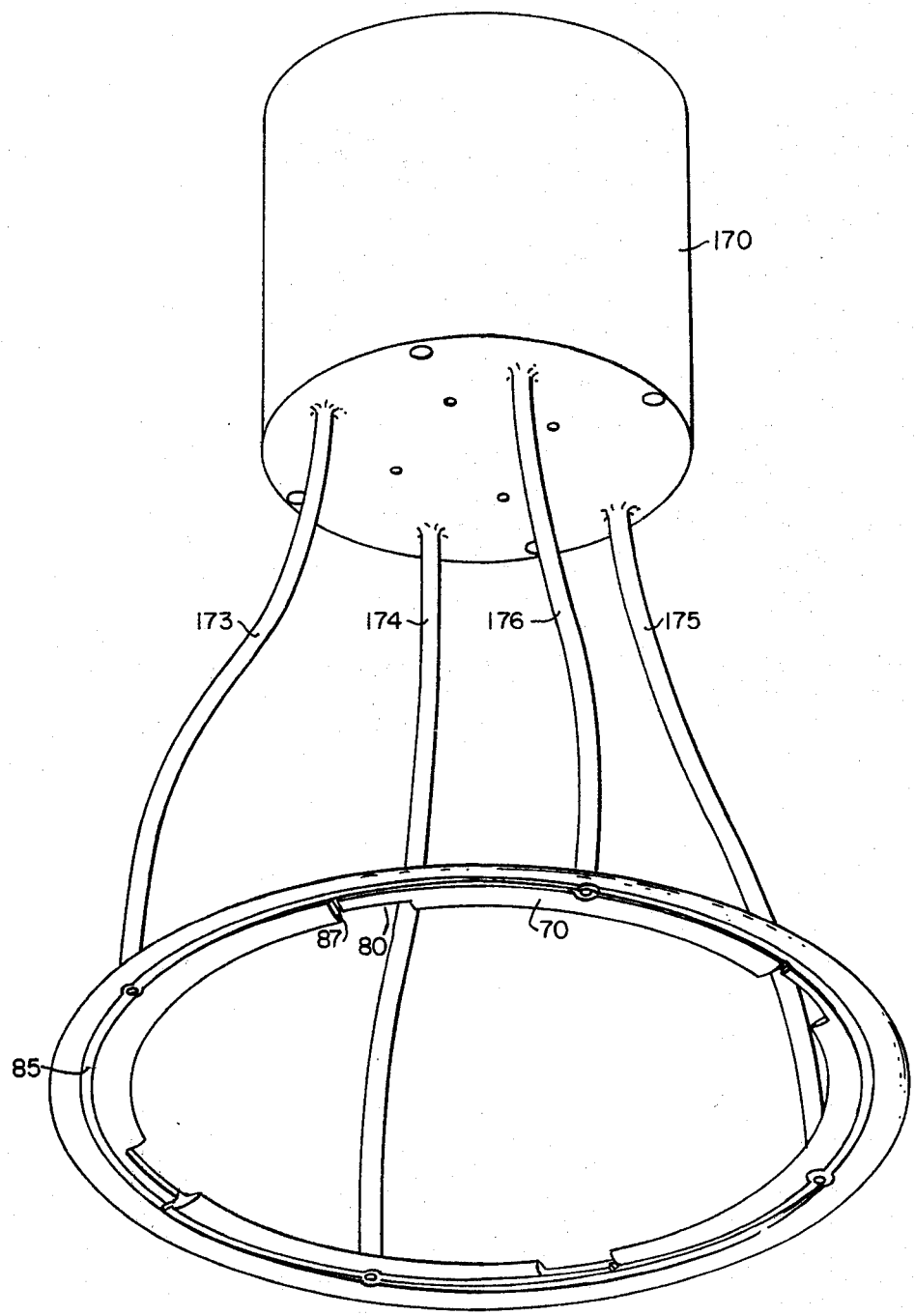
FIG. 13 is a view looking up at the support ring coupled to a housing for the electronic portion of FIG. 11.

The entire electronic section 152 may be placed into a housing 170 as illustrated in FIG. 13 connected to the ring 70 previously illustrated in FIGS. 3 and 3A, by means of relatively narrow support struts 173 to 176.

The underside of the ring 70 is illustrated in the absence of transducers and polyurethane material to show the groove undersurface and notches for transducers. At least one and preferably all of the support struts 173 to 176 are hollow so that wires may be inserted therein for signal communication between the transducers and the electronic section in housing 170.

I claim:
1. Fluid flow measuring apparatus comprising:
   A a plurality of pairs of acoustic transducers;
   B support means for supporting said pairs of transducers such that each said pair is positioned along respective acoustic axes;
   C said support means being constructed and arranged to extend along a generally circular path from one transducer to a next so as to provide an obstruction to fluid flow at an angle of $\pm \theta$ from each said transducer.
2. Apparatus according to claim 1 wherein:
   A. said support means is a continuous circular ring.
3. Apparatus according to claim 2 wherein:
   A. said ring has a circular cross section.
4. Apparatus according to claim 2 wherein:
   A. said ring has a hydrofoil shaped cross section defining a rounded leading edge and a tapered trailing edge.
5. Fluid flow measuring apparatus comprising:
   A. a plurality of pairs of acoustic transducers;
   B. a support ring supporting said transducers;
   C. an electronics section coupled to and in signal communication with said transducers for obtaining current velocity measurements;
   D. said transducers being supported by said ring such that the transducers of each said pair are acoustically coupled to one another along an acoustic path;
   E. each said acoustic path being within the central portion of said ring.
6. Apparatus according to claim 5 wherein:
   A. two pairs of said transducers are provided and
   B. said acoustic paths are mutually perpendicular.
7. Apparatus according to claim 5 wherein:
   A. said support ring includes a plurality of notches;
   B. each said transducer being positioned within a respective one of said notches.
8. Apparatus according to claim 7 wherein:
   A. said transducers are covered with a potting material having similar acoustic transmission properties as the ambient water medium.
9. Apparatus according to claim 8 wherein:
   A. said potting material is shaped to conform with the cross sectional shape of said support ring.
10. Apparatus according to claim 7 wherein:
    A. said support ring includes a grooved portion, communicative with said notches, for placement of signal conducting wires.
11. Apparatus according to claim 5 which includes:
    A. a housing member;
    B. said electronics section being contained within said housing member; and
    C. strut means connecting said housing member with said support ring.
12. Apparatus according to claim 11 wherein:
    A. said strut means includes a plurality of support struts;
    B. at least one of said support struts being hollow for receipt of signal conducting wires between said electronics section and said support ring.

* * * * *